United States Patent
Hoshino

(10) Patent No.: US 6,799,025 B1
(45) Date of Patent: Sep. 28, 2004

(54) BASE STATION SYSTEM, AND WIRELESS COMMUNICATION METHOD

(75) Inventor: Masayuki Hoshino, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 584 days.

(21) Appl. No.: 09/856,580

(22) PCT Filed: Sep. 26, 2000

(86) PCT No.: PCT/JP00/06592

§ 371 (c)(1),
(2), (4) Date: May 23, 2001

(87) PCT Pub. No.: WO01/24406

PCT Pub. Date: Apr. 5, 2001

(30) Foreign Application Priority Data

Sep. 29, 1999 (JP) .......................................... 11-276223

(51) Int. Cl.$^7$ ............................................... G01S 3/16
(52) U.S. Cl. ................. 455/276.1; 455/522; 455/562.1; 342/368; 342/378; 342/173; 342/174
(58) Field of Search ............................ 455/522, 562.1, 455/278.1, 63.1, 276.1; 342/378, 368, 383, 172, 173; 375/148; 370/347

(56) References Cited

U.S. PATENT DOCUMENTS

| 5,274,844 A | * | 12/1993 | Harrison et al. ............... 455/25 |
| 5,572,219 A |   | 11/1996 | Silverstein et al. |
| 5,806,001 A | * | 9/1998 | Yokota ......................... 455/507 |
| 6,064,338 A | * | 5/2000 | Kobayakawa et al. ...... 342/378 |
| 6,084,928 A | * | 7/2000 | Kuwahara .................... 375/347 |
| 6,346,910 B1 | * | 2/2002 | Ito .............................. 342/174 |

FOREIGN PATENT DOCUMENTS

| JP | 3069202 | 3/1991 |
| JP | 3165607 | 7/1991 |
| JP | 9121195 | 5/1997 |
| JP | 9186643 | 7/1997 |
| JP | 9284200 | 10/1997 |

* cited by examiner

Primary Examiner—Nay Maung
Assistant Examiner—Alan T. Gantt
(74) Attorney, Agent, or Firm—Stevens, Davis, Miller & Moshers, LLP

(57) ABSTRACT

When directional transmission using user multiplexing is performed in CDMA communication, the phase offset for setting antenna balance adaptively is determined. By this means, the antenna elements giving the maximum or minimum amplitude are dispersed reliably among individual users. As a result, the amplitude bias toward a specific antenna element can be decreased and the load on the transmission amplifier is further alleviated.

6 Claims, 3 Drawing Sheets

BASE STATION SYSTEM, AND WIRELESS COMMUNICATION METHOD

TECHNICAL FIELD

The present invention relates to a base station apparatus equipped with an array antenna that has a plurality of antennas used in a digital radio communication system, and a radio communication method.

BACKGROUND ART

In a digital radio communication system, adaptive radio transmission technology is applied and an array antenna that has a plurality of antenna elements is used. A linear array antenna is used as one kind of array antenna. This linear array antenna has a configuration in which a plurality of antenna elements are placed in a straight line at intervals of half the wavelength of the carrier frequency.

With a linear array antenna, complex amplitude multiplication is performed for received signals that are input via the respective antennas, to give an arbitrary directivity. This technology has been disclosed in Unexamined Japanese Patent Publication No. 9-284200. Here, as an example of a linear array antenna, a base station apparatus equipped with a linear array antenna comprising four antennas arranged in a straight line will be described.

FIG. 1 is a block diagram showing the configuration of a base station apparatus equipped with a conventional linear antenna. With this base station apparatus, four antennas 1 to 4 receive radio signals, the prescribed radio reception processing (down-conversion, A/D conversion, etc.) is performed for the respective radio signals by RF sections 5 to 8 provided for each antenna, and a signal in the stipulated frequency band or intermediate frequency band is obtained. Then, in this base station apparatus, this signal is subjected to demodulation processing and receive data is obtained.

With regard to transmit data, on the other hand, after digital modulation by a modulation section 10 for the respective users, these post-modulation signals are linearly added, the prescribed radio transmission processing (D/A conversion, up-conversion) is performed by RF sections 5 to 8, and the signals are transmitted to antennas 1 to 4.

When a linear antenna is used in a base station apparatus, when communication is performed the signal power in a specific direction is adjusted, giving arbitrary directivity. In this case, a weight vector product section 9 finds the complex amplitude product for the received signals from each antenna, and gives an arbitrary directivity using the result. For example, if communication is performed with a mobile station 12 in direction θ from a base station apparatus 11, as shown in FIG. 2, the product is found of the complex amplitude vector shown in expression (1) below for the received signals in the order of the antennas of the base station apparatus 11.

$$W = [1, \exp(-j\pi \sin \theta), \exp(-j2\pi \sin \theta), \exp(-j3\pi \sin \theta)]^T \quad \text{expression (1)}$$

By performing the above kind of vector multiplication for the received signals, the signal transmitted from the base station apparatus 11 has maximum power in the θ direction, and it is possible to form a power distribution (beam) that becomes weaker with increasing distance from θ. With four linear array antennas, it is possible to drop the signal power by half or more when θ±22.5 is exceeded.

The formation of this power distribution is called beam forming in the θ direction. By means of this beam forming, it is possible to increase the signal power for the desired signal, so that in communication with a certain user there is little susceptibility to influence by received signals from other user directions, and it is also possible to reduce the power of transmitted signals to users in other directions that constitute unwanted waves. It is possible, for example, to perform simultaneous processing as shown in FIG. 2, with beam 14 in the θ direction used for communication with mobile station 12 in the θ direction, and beam 15 in the φ direction used for communication with mobile station 13 in the φ direction.

By this means, it is possible to expect improved quality of communication with users, and increased communication capacity of the system as a whole.

However, the following kinds of problem arise in transmit operations using a linear array in the above kind of base station apparatus. In vector multiplication in the process of beam forming in a base station apparatus, the signal received from a specific antenna is normally used as a reference, and this signal is multiplied by a complex amplitude in which the real part is 1 and the imaginary part is 0. In expression (1) above, the complex amplitude multiplied for the first antenna has real part 1 and imaginary part 0.

Therefore, in this vector multiplication, whereas the real part is 1 and the imaginary part 0 for a beam in any direction for the first antenna, for the other antennas a component emerges that is cancelled in multiplexing of beams from phase rotation. As a result, when this kind of vector multiplication is performed, the transmission power increases only for the first antenna, and with 50 users, for example, has the power of 50 signals, and the dynamic range of the transmission amplifier must be increased.

DISCLOSURE OF INVENTION

It is an objective of the present invention to provide a base station apparatus and radio communication method that enable directivity forming to be performed in transmission using an array antenna that has a plurality of antenna elements, and that moreover enable the transmission amplifier load to be alleviated.

A main subject of the present invention is to apply the same phase rotation to each element of a weight vector in a specific direction, to disperse the antenna elements giving the maximum or minimum amplitude among individual users, and decrease the amplitude bias toward a specific antenna element, and thereby to alleviate the load on the transmission amplifier.

BEST MODE FOR CARRYING OUT THE INVENTION

Embodiments of the present invention will be described specifically below with reference to accompanying drawings.

Embodiment 1

Figure 1:
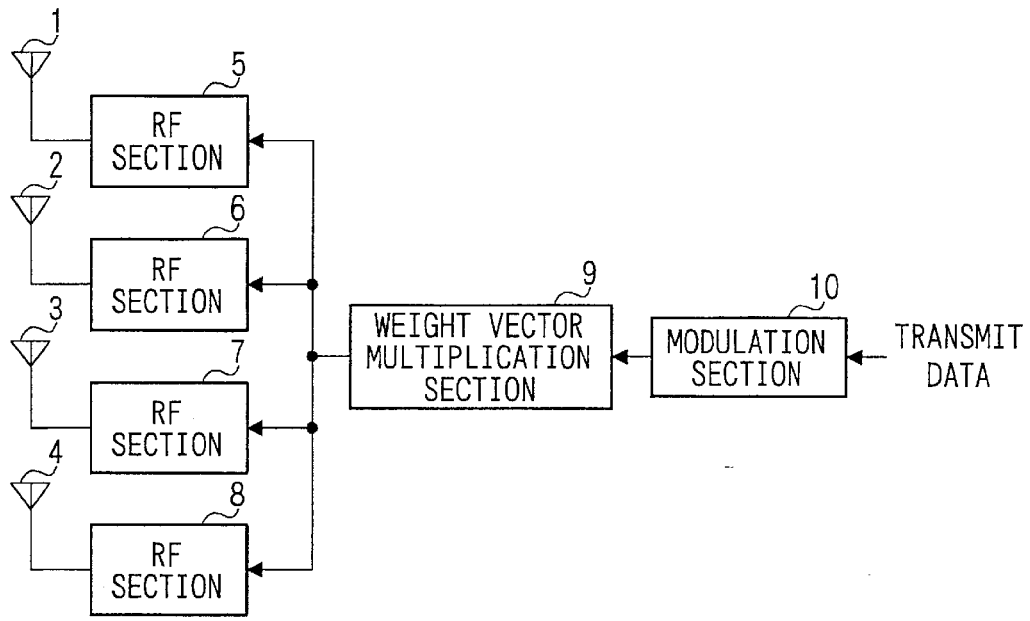
FIG. 1 is a block diagram showing the configuration of a conventional base station apparatus.
Figure 2:
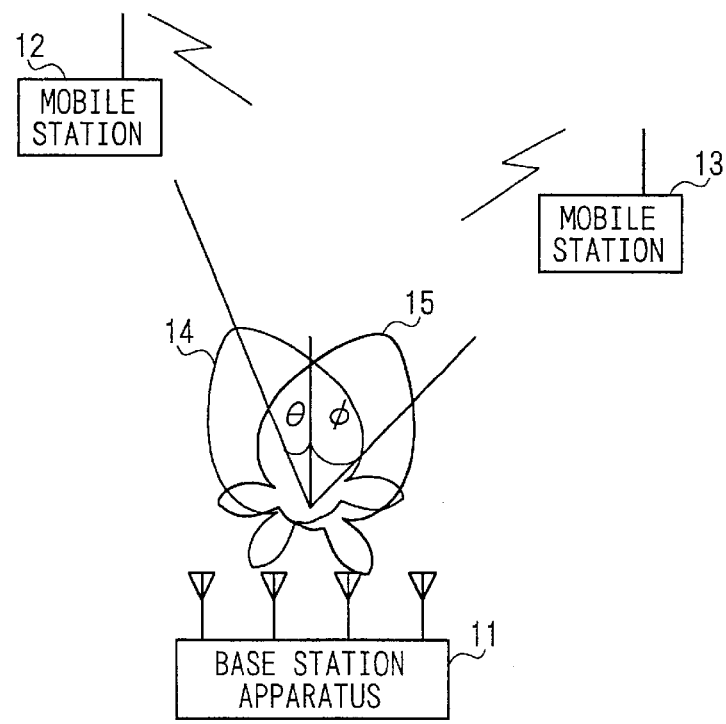
FIG. 2 is a drawing to explain beam forming.
Figure 3:
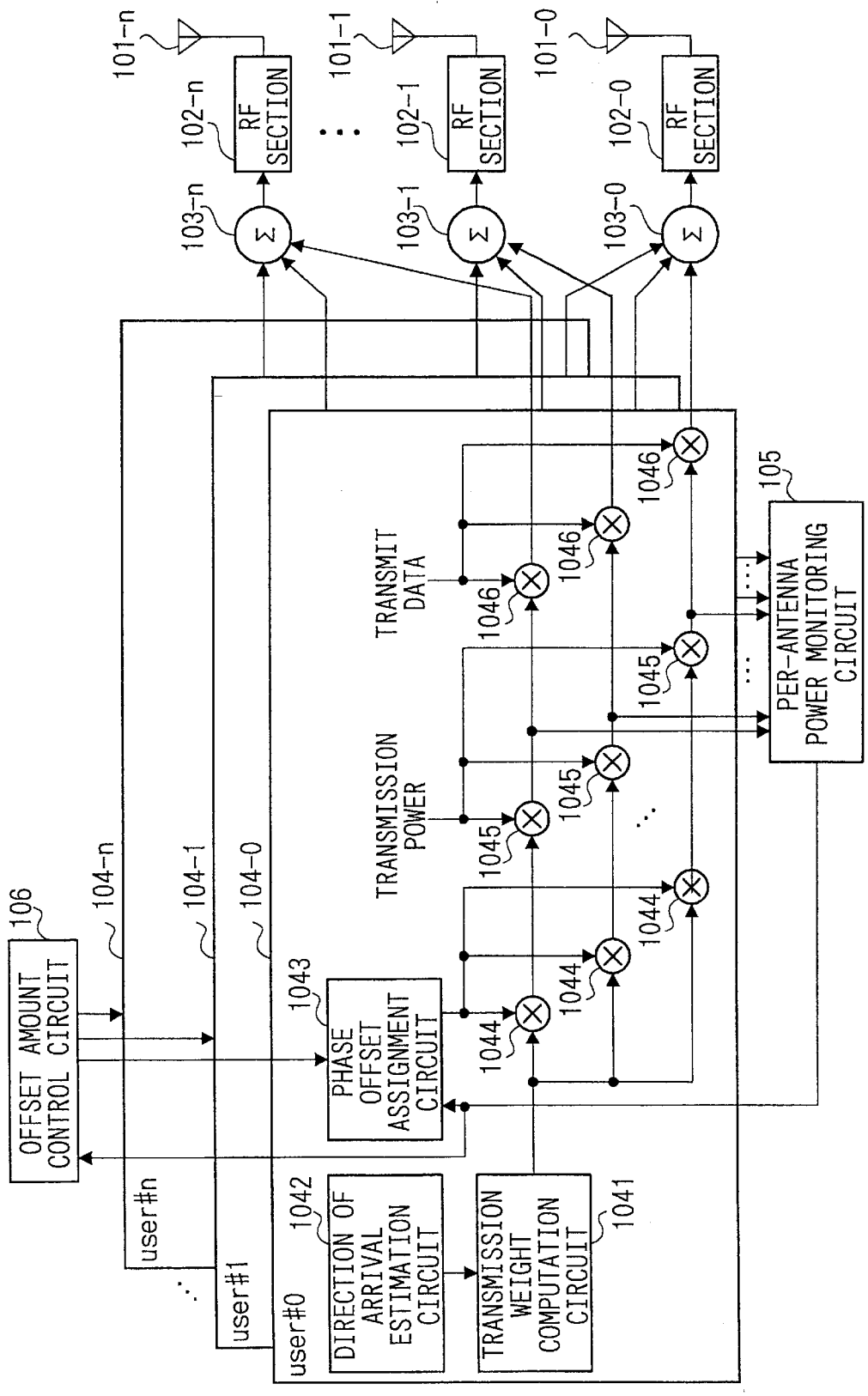
FIG. 3 is a block diagram showing the configuration of a base station apparatus according to Embodiment 1 of the present invention.

FIG. 3 is a block diagram showing the configuration of a base station apparatus according to Embodiment 1 of the present invention. In this base station apparatus, it is assumed that a plurality of antennas 101-0 to 101-n are arranged in a straight line at equal intervals. In FIG. 3, only the configuration of the transmitting side is shown; the configuration of the receiving side is the same as the conventional configuration, and is therefore omitted.

In the base station apparatus shown in FIG. 3, signals received from antennas 101-0 to 101-n are sent to RF sections 102-0 to 102-n provided for the respective antennas, where the prescribed radio reception processing (down-conversion, A/D conversion, etc.) is performed. The signal in the stipulated frequency band or intermediate frequency band subjected to this radio reception processing is the receive data on which demodulation processing is performed.

As regards transmit data, on the other hand, after digital modulation has been performed for the respective users, linear addition is performed by multiplexing sections 103-0 to 103-n, the prescribed radio transmission processing (D/A conversion, up-conversion) is performed by RF sections 102-0 to 102-n, and the resulting signals are transmitted to the respective users in a beam-formed state via antennas 101-0 to 101-n. This beam forming is performed for each user by processing sections 104-0 to 104-n provided for each user.

Next, beam forming according to the present invention in processing sections 104-0 to 104-n will be described. Here, the case is described in which the number of antennas n is 4 and the transmission weight calculation method is the beam steering method.

These processing sections 104-0 to 104-n each comprise an arrival direction estimation circuit 1042 that estimates the direction of arrival of a received signal, a transmission weight computation circuit 1041 that finds the transmission weight based on the estimated direction of arrival, and a phase offset assignment circuit 1043 that assigns a phase offset to the transmission weight.

When beam forming (power distribution forming) according to this embodiment is performed, the direction of arrival is first estimated based on the received signal in the arrival direction estimation circuit 1042. The result of this estimation is sent to the transmission weight computation circuit 1041. Specifically, a plurality of beams are formed beforehand by shifting the central angle, the communication quality of the signal received in each beam is found, and the beam with the best communication quality is selected. Then, information on the angle of this selected beam is sent to the transmission weight computation circuit 1041. Here, the SIR (Signal to Interference Ratio), reception strength, or the like, can be used as the communication quality of the signal received in each beam.

In the transmission weight computation circuit 1041, the transmission weight is calculated based on the angle information output from the arrival direction estimation circuit 1042. In the beam steering method, the weight in above expression (1) is used when communication is performed with a mobile station in a specific direction (θ direction).

A phase offset is assigned to this transmission weight by a multiplier 1044 for each antenna. This phase offset is prepared by the phase offset assignment circuit 1043 so as to give a phase rotation of ψ. At this time, the phase offset corresponding to each antenna is the same for one user. Thus, multiplying the transmission weight by the phase offset is multiplying above expression (1) by expression (2) below. As a result, the transmission weight after phase offset multiplication is as shown in expression (3) below.

$$Woffset=[exp(j\psi), exp(j\psi), exp(j\psi), exp(j\psi)]T \qquad \text{expression (2)}$$

$$W=[exp(j\psi), exp(-j(\pi \sin \theta-\psi)), exp(-j(2\pi \sin \theta-104)), exp(-j(3\pi \sin \theta-\psi))]T \qquad \text{expression (3)}$$

If ψ in expressions (2) and (3) is set as ψ=n π sin θ (n=0, 1, 2, 3), in expression (3) the complex amplitude for any antenna (the nth antenna) has a real part of 1 and imaginary part of 0. Therefore, by assigning in advance the same phase offset stipulated by ψ=nπsin θ (n=0, 1, 2, 3) for each antenna, for one user, it is possible to determine uniquely the antenna giving the maximum or minimum amplitude.

By changing this phase offset for each user, it is possible to change the antenna giving the maximum or minimum amplitude for each user. Therefore, since it is possible to disperse antennas for which the transmission power increases, it is possible to prevent concentration of the maximum amplitude on a specific antenna and the imposition of an excessive load on the transmission amplifier. The phase offset between users is controlled by an offset amount control circuit 106.

For the transmission weight to which a phase offset is assigned, the transmission power is calculated by a multiplier 1045 and the actual transmission power of each antenna is found. This actual transmission power per antenna is sent to a per-antenna power monitoring circuit 105.

The per-antenna power monitoring circuit 105 monitors the transmission power of each antenna determined for each user. Even if the phase offset is changed for each user and multiplied by the transmission weight as described above, there will still be cases where there are antennas with a high total transmission power and antennas with a low total transmission power in the overall base station apparatus. The per-antenna power monitoring circuit 105 calculates the difference in the transmission power of the antennas and prevents a large difference in transmission power from arising among the antennas. The detection method can be implemented by determining a threshold value for the difference in transmission power among the antennas, for example.

By this means, when directional transmission using user multiplexing is performed in CDMA communication, it is possible to determine the phase offset for setting antenna balance adaptively, and to reliably disperse the antenna elements giving the maximum or minimum amplitude among individual users. As a result, it is possible to decrease the amplitude bias toward a specific antenna element, and to further alleviate the load on the transmission amplifier.

If the difference in transmission power among the antennas is large in the per-antenna power monitoring circuit 105, the per-antenna power monitoring circuit 105 reports that fact to the offset amount control circuit 106. When a control signal is sent from the per-antenna power monitoring circuit 105, the offset amount control circuit 106 changes the phase offset to be assigned to the transmission weight of each antenna and assigns it to the transmission weight.

There are no particular limitations on the method of changing the phase offset in the offset amount control circuit 106. For example, it is possible for the offset amount control circuit 106 to send control signals to the phase offset assignment circuit 1043 of processing sections 104-0 to 104-n of all the users, and the phase offset to be changed by the phase offset assignment circuit 1043, and it is equally possible for the user with the highest transmission power and the user with the lowest transmission power to be extracted by the per-antenna power monitoring circuit 105, and have the offset amounts of the extracted users exchanged. In this way, control is performed so as to disperse the antenna load.

By this means, the difference in total transmission power among the antennas is compensated, variance in transmission power among the antennas is made small, and the transmission amplifier load is alleviated. By means of such a method it is possible to adjust the difference in transmission power among the antennas.

The transmission weight determined in this way is multiplied by the transmit data by means of a multiplier 1046. Transmit data that has been multiplied by the transmission weight in this way is user-multiplexed for each antenna by multiplexing sections 103-0 to 103-n.

Looked at from the viewpoint of a mobile station, the fact that a change in the propagation path conditions, and particularly phase rotation, has been caused is recognized even when a phase offset is assigned by the base station apparatus, and therefore phase compensation can be implemented by normal processing. Consequently, there is no need for the addition of special processing on the mobile station side when receiving.

Embodiment 2

Figure 4:
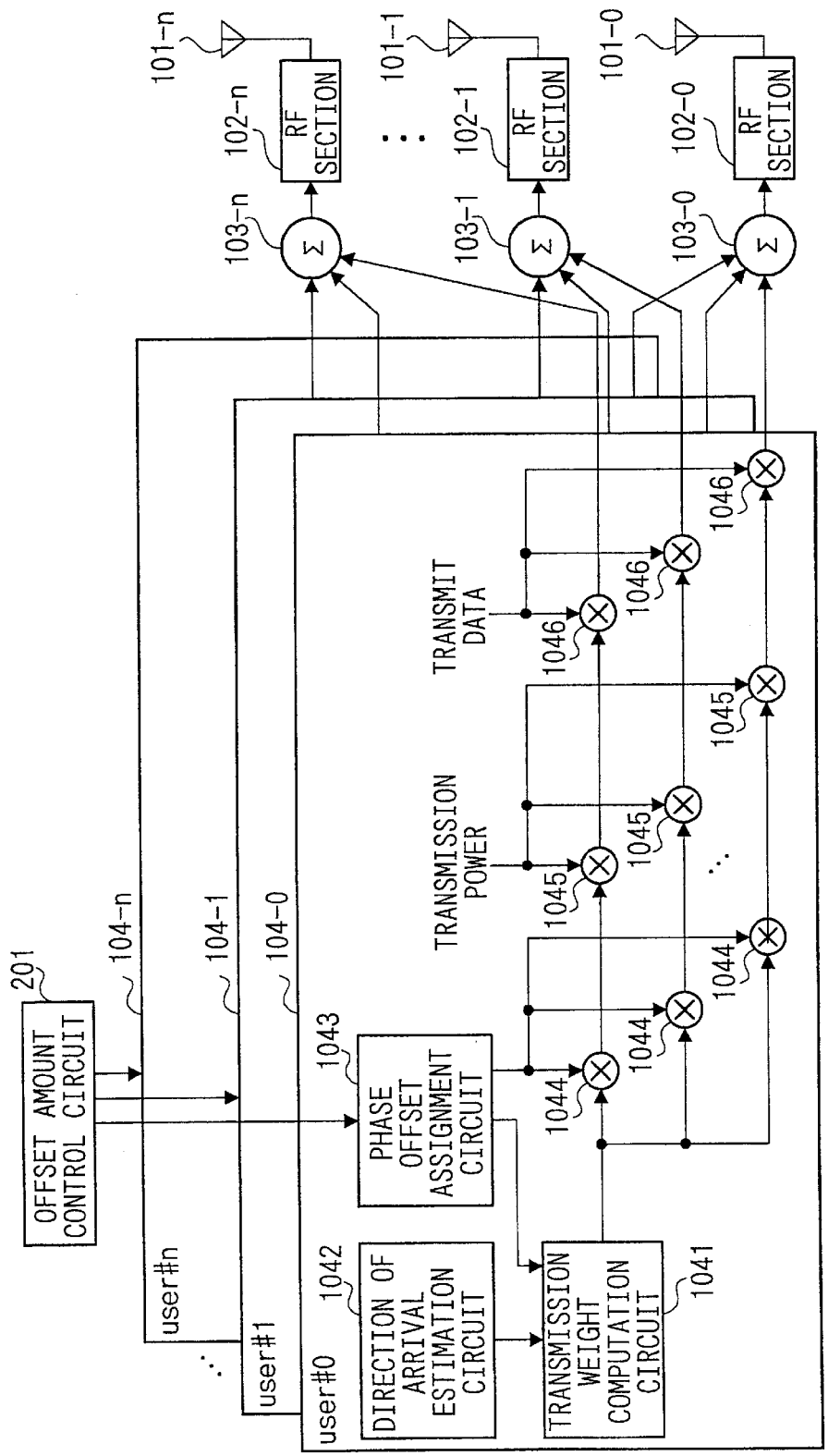
FIG. 4 is a block diagram showing the configuration of a base station apparatus according to Embodiment 2 of the present invention.

FIG. 4 is a block diagram showing the configuration of a base station apparatus according to Embodiment 2 of the present invention. The parts in FIG. 4 identical to those in FIG. 3 are assigned the same codes as in FIG. 3, and their detailed explanations are omitted. In this base station apparatus, it is assumed that a plurality of antennas 101-0 to 101-n are arranged in a straight line at equal intervals. In FIG. 4, only the configuration of the transmitting side is shown; the configuration of the receiving side is the same as the conventional configuration, and is therefore omitted.

When beam forming according to this embodiment is performed, the direction of arrival is first estimated based on the received signal in the arrival direction estimation circuit 1042. The result of this estimation is sent to the transmission weight computation circuit 1041. The procedure for estimating the direction of arrival is the same as for Embodiment 1. In the transmission weight computation circuit 1041, the transmission weight is calculated based on the angle information output from the arrival direction estimation circuit 1042. In the beam steering method, the weight in above expression (1) is used when communication is performed with a mobile station in a specific direction (θ direction). Also, phase offset information for assigning ψ phase rotation is sent to the arrival direction estimation circuit 1042 from the phase offset assignment circuit 1043, and a phase offset is assigned to the transmission weight. In other words, the product of above expression (1) and expression (2) is found by the transmission weight computation circuit 1041. Therefore, although the phase offset itself is fixed for each user, since it is multiplied by the transmission weight a phase rotation is applied randomly for each antenna. In this case also, it is possible to determine uniquely the antenna giving the maximum or minimum amplitude.

By changing this phase offset for each user, it is possible to change the antenna giving the maximum or minimum amplitude for each user. Therefore, since it is possible to disperse antennas for which the transmission power increases, it is possible to prevent concentration of the maximum amplitude on a specific antenna and the imposition of an excessive load on the transmission amplifier. The phase offset between users is controlled by an offset amount control circuit 201.

The present invention is not limited to the above Embodiments 1 and 2, but can be implemented with various changes. For example, in above Embodiments 1 and 2 the case is described where the number of antennas is 4, but the number of antennas can be other than 4.

Also, in above Embodiments 1 and 2 the case is described where the transmission weight calculation method is beam steering, but another method can be used. In this case, the same kind of control can be achieved even if, for example, null steering that lowers the gain to an extreme degree in a specific direction is used.

Moreover, in above Embodiments 1 and 2 the case is described where the object of per-antenna power monitoring is the transmission weight multiplied by the phase offset, but it is also possible to monitor the transmission power and transmission weight of each user and incorporate these two to control the phase offset.

In above Embodiments 1 and 2 the case is described where a linear array antenna in which a plurality of antenna elements are arranged in a straight line is used as an array antenna that has a plurality of antenna elements, but the present invention is similarly applicable to cases where an array antenna in which a plurality of antenna elements are arranged in a circle, an array antenna in which a plurality of antenna elements are arranged two-dimensionally other than in a circle, or an array antenna in which a plurality of antenna elements are arranged three-dimensionally, is used as an array antenna that has a plurality of antenna elements.

A base station apparatus of the present invention employs a configuration comprising an array antenna composed of a plurality of antenna elements, a transmission weight calculation section that calculates the transmission weight for each above-described antenna element based on the direction of arrival of the received signal, a phase offset assignment section that assigns a user-specific phase offset to the above-described transmission weight, and a power distribution forming section that performs power distribution forming using a transmission weight to which the above-described phase offset has been assigned.

A base station apparatus of the present invention employs a configuration comprising an array antenna composed of a plurality of antenna elements, a processing section that comprises for each user a transmission weight calculation section that calculates the transmission weight for each above-described antenna element based on the direction of arrival of the received signal together with a phase offset assignment section that assigns a user-specific phase offset to the above-described transmission weight, and a directional transmission section that performs directional transmission by multiplexing, for each above-described antenna element, signals to which a transmission weight, to which the above-described phase offset has been assigned by the above-described processing section, has been assigned.

According to these configurations, an identical phase offset is applied to each antenna with regard to the weight vector in a specific direction, and therefore it is possible to determine uniquely the antenna element giving the maximum or minimum amplitude. By this means, it is possible to disperse the antenna elements giving the maximum or minimum amplitude among individual users. As a result, it is possible to decrease the amplitude bias toward a specific antenna element, and to alleviate the load on the transmission amplifier.

A base station apparatus of the present invention, in the above-described configuration, is equipped with a monitoring section that monitors the transmission power for each antenna element, and employs a configuration whereby the phase offset is changed when the difference in transmission power among the antenna elements exceeds a prescribed value.

According to this configuration, it is possible to disperse reliably the antenna elements giving the maximum or minimum amplitude among individual users. As a result, it is possible to decrease the amplitude bias toward a specific antenna element, and to further alleviate the load on the transmission amplifier.

A base station apparatus of the present invention, in the above-described configuration, employs a configuration whereby a transmission weight calculation section calculates the transmission weight by means of beam steering, and the above-described phase offset assignment section uses a phase offset such that $\psi = n\,\pi\,\sin\theta$ (number of antennas n=0, 1, 2, 3).

The power monitoring apparatus of the present invention employs a configuration comprising a processing section that comprises for each user a transmission weight calculation section that calculates the transmission weight for each of a plurality of antenna elements based on the direction of arrival of the received signal together with a phase offset assignment section that assigns a user-specific phase offset to the above-described transmission weight, and a monitoring section that changes the phase offset when the difference in transmission power among the above-described antenna elements exceeds a prescribed value.

By this means, when directional transmission using user multiplexing is performed in CDMA communication, it is possible to determine the phase offset for setting antenna balance adaptively.

A radio communication method of the present invention comprises a transmission weight calculation step of calculating the transmission weight for each of a plurality of antenna elements comprising an array antenna, a phase offset assignment step of assigning a user-specific phase offset to the above-described transmission weight, a power distribution forming step of performing power distribution forming using the transmission weight to which the above-described phase offset has been assigned, and a transmitting step of performing transmission with the formed power distribution.

According to this method, an identical phase offset is applied to each antenna with regard to the weight vector used for beam forming in a specific direction, and therefore it is possible to determine uniquely the antenna element giving the maximum or minimum amplitude. By this means, it is possible to disperse the antenna elements giving the maximum or minimum amplitude among individual users. As a result, it is possible to decrease the amplitude bias toward a specific antenna element, and to alleviate the load on the transmission amplifier.

A radio communication method of the present invention, in the above-described method, comprises a monitoring step of monitoring the difference in transmission power among the antenna elements, and changing step of changing the phase offset when the above-described difference in transmission power exceeds a prescribed value.

According to this method, it is possible to disperse reliably the antenna elements giving the maximum or minimum amplitude among individual users. As a result, it is possible to decrease the amplitude bias toward a specific antenna element, and to further alleviate the load on the transmission amplifier.

The power monitoring method of the present invention comprises a step of calculating the transmission weight for each of a plurality of antenna elements based on the direction of arrival of the received signal, a phase offset step of assigning a user-specific phase offset to the above-described transmission weight, and a step of monitoring the transmission power for each of the above-described plurality of antenna elements and changing the phase offset when the difference in transmission power among the above-described antenna elements exceeds a prescribed value.

According to this method, when directional transmission using user multiplexing is performed in CDMA communication, it is possible to determine the phase offset for setting antenna balance adaptively.

According to the present invention, as described above, an identical phase rotation is applied to each element of the weight vector in a specific direction, the antenna elements giving the maximum or minimum amplitude are dispersed among individual users, and thye amplitude bias toward a specific antenna element is decreased, so that, in beam forming by means of an array antenna, it is possible to disperse the transmission amplitude load that arises when a plurality of beams are multiplexed.

When directional transmission using user multiplexing is performed in CDMA communication, it is possible to determine the phase offset for setting antenna balance adaptively, and to disperse reliably the antenna elements giving the maximum or minimum amplitude among individual users. As a result, it is possible to decrease the amplitude bias toward a specific antenna element, and to further alleviate the load on the transmission amplifier. Consequently, it is no longer necessary to use a large amplifier dynamic range when designing a base station, and it is possible to reduce the scale and cost of the apparatus.

This application is based on the Japanese Patent Application No. HEI11-276223 filed on Sep. 29, 1999, entire content of which is expressly incorporated by reference herein.

Industrial Applicability

The present invention is applicable to a base station apparatus in a digital radio communication system.

What is claimed is:

1. A base station apparatus comprising:
an array antenna comprising a plurality of antenna elements;
an arrival direction estimation circuit that estimates a direction of arrival of a received signal;
a transmission weight calculating section that calculates a transmission weight for each of said antenna elements based on the direction of arrival of the received signal;
an offset amount control circuit for controlling a phase offset to be assigned to the transmission weight of said each of said antenna elements;
a phase offset assigning section that receives said phase offset and assigns a user-specific phase offset to the transmission weight of said each of said antenna elements;
a directional transmitting section that performs directional transmission using the transmission weight of said each of said antenna elements to which the user-specific phase offset has been assigned; and
a monitoring section that monitors a transmission power for each of said antenna elements,
wherein the user-specific phase offset is changed when a difference in transmission power among said antenna elements exceeds a prescribed value.

2. The base station apparatus according to claim 1, wherein the transmission weight calculating section calculates the transmission weight of said each of said antenna elements by means of beam steering and said phase offset assigning section assigns the user-specific phase offset such that phase rotation $\psi = n\Pi \sin\theta$, where a number of antennas n equals 0, 1, 2 or 3 and $\theta$ represents a direction of a mobile station to the base station apparatus.

3. A base station apparatus comprising:
   (a) an array antenna comprising a plurality of antenna elements;
   (b) a processing section that comprises for each user of a plurality of users:
      (i) an arrival direction estimation circuit that estimates a direction of arrival of a received signal;
      (ii) a transmission weight calculating section that calculates a transmission weight for each of said antenna elements based on the direction of arrival of the received signal;
      (iii) a phase offset control section that controls a phase offset to be assigned to the transmission weight of each of said antenna elements; and
      (iv) a phase offset assigning section that receives said phase offset and assigns a user-specific phase offset to said transmission weight of each of said antenna elements,
   wherein said processing section produces signals corresponding to each of said antenna elements, said signals having said transmission weight and said user-specific phase offset assigned thereto; and
   (c) a directional transmitting section that performs directional transmission by multiplexing, for each of said antenna elements, said signals that correspond to each of said users and that have said transmission weight and said user-specific phase offset assigned thereto.

4. A power monitoring apparatus comprising:
   a processing section that comprises a transmission weight calculating section that calculates a transmission weight for each of a plurality of antenna elements, based on a direction of arrival of a received signal, and a phase offset assigning section that assigns a user-specific phase offset to the transmission weight for each of said antenna elements; and
   a monitoring section that monitors a transmission power for each of said antenna elements and changes the user-specific phase offset when a difference in transmission power among said antenna elements exceeds a prescribed value.

5. A radio communication method comprising the steps of:
   estimating a direction of arrival of a received signal;
   calculating a transmission weight for each of a plurality of antenna elements constituting an array antenna;
   assigning a user-specific phase offset to said transmission weight for each of said antenna elements;
   forming a power distribution for said antenna elements using the transmission weight for each of said antenna elements to which said user-specific phase offset has been assigned;
   transmitting said power distribution through said antenna elements;
   monitoring a difference in transmission power among said antenna elements; and
   changing the user-specific phase offset when said difference in transmission power exceeds a prescribed value.

6. A power monitoring method comprising the steps of:
   calculating a transmission weight for each of a plurality of antenna elements based on a direction of arrival of a received signal;
   assigning a user-specific phase offset to said transmission weight of each of said antenna elements; and
   monitoring a transmission power for each of said antenna elements and changing the user-specific phase offset when a difference in transmission power among said antenna elements exceeds a prescribed value.

* * * * *